UNITED STATES PATENT OFFICE.

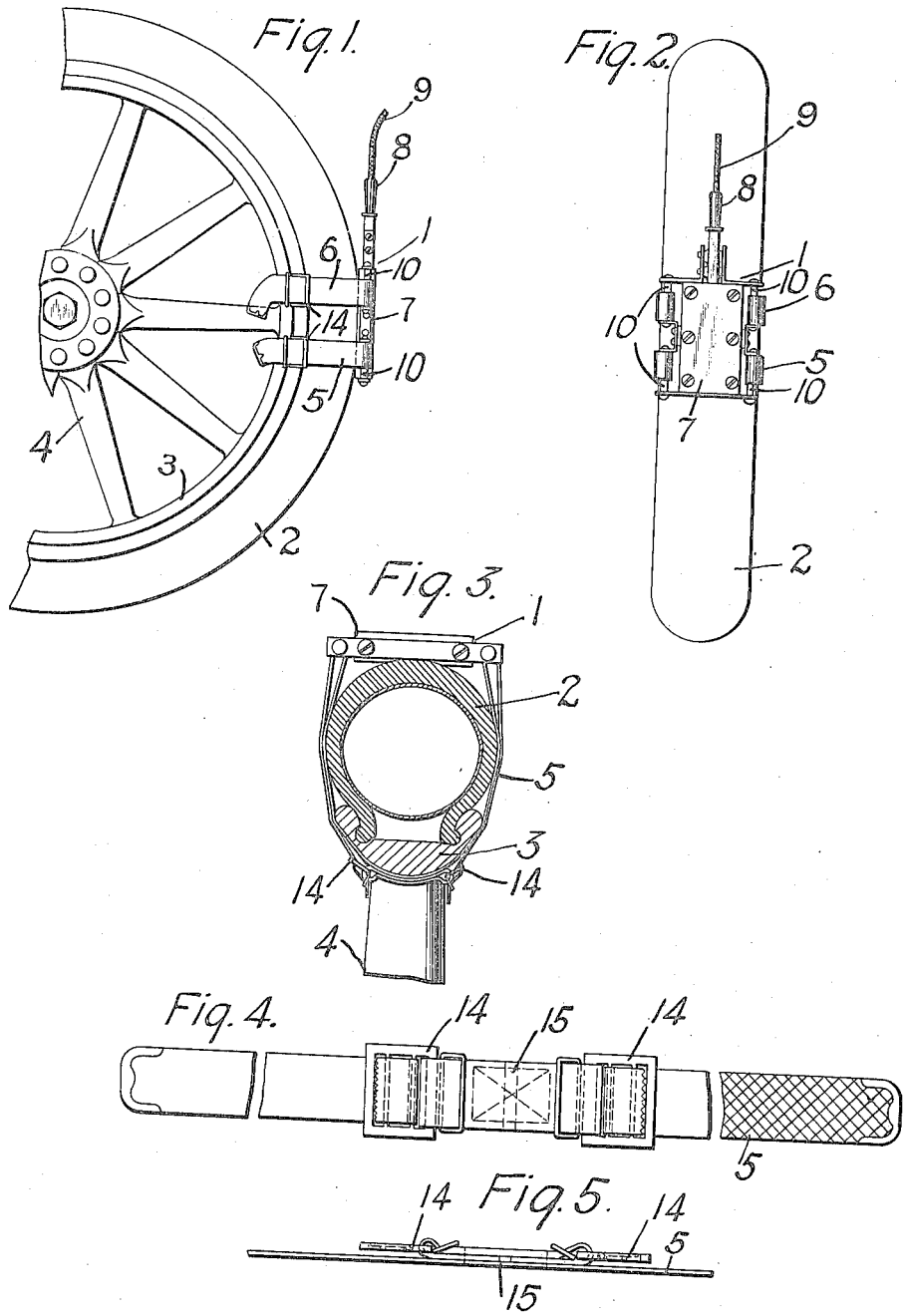

EDWARD E. ROSE, OF SWISSVALE, PENNSYLVANIA, ASSIGNOR TO WESTINGHOUSE ELECTRIC AND MANUFACTURING COMPANY, A CORPORATION OF PENNSYLVANIA.

ELECTRICALLY-HEATED VULCANIZER.

1,206,255.

Specification of Letters Patent. Patented Nov. 28, 1916.

Application filed January 10, 1912. Serial No. 670,524.

*To all whom it may concern:*

Be it known that I, EDWARD E. ROSE, a citizen of the United States, and a resident of Swissvale, in the county of Allegheny and State of Pennsylvania, have invented a new and useful Improvement in Electrically-Heated Vulcanizers, of which the following is a specification.

My invention relates to electrically heated vulcanizers for repairing tires of bicycle and automobile wheels and similar purposes, and it has for its object to provide a device of the above-indicated character that shall embody simple and inexpensive means for effectively attaching the device to a tire in such manner that repairs may be easily made without removing the tire from the wheel.

In the prior art, provisions have been made for securing similar devices in position, but usually metallic chains or bent rods have been employed for encircling the rim of the supporting wheel and such chains or rods have been adjustably secured to the body of the vulcanizer by means of coöperating threaded members and wing-nuts or other similar devices. Considerable inconvenience and difficulty has been experienced with attaching devices of the kind referred to, for the reason that the parts thereof became heated during the operation of the vulcanizer and were therefore difficult to manipulate and often burned the hands of the operator and scratched or burned the finish of the wheel rims. Furthermore, such devices were cumbersome and inconvenient for a single person to handle.

According to my present invention, I provide simple and adequate means for securing or strapping a vulcanizer in position which overcomes the difficulties hereinbefore mentioned and generally improves the construction of such devices and increases their utility and effectiveness.

In the accompanying drawings, Figure 1 is a view in side elevation of a tire and supporting wheel to which a vulcanizer embodying my invention is attached. Fig. 2 is an end view of the apparatus shown in Fig. 1. Fig. 3 is an enlarged sectional view of the same apparatus, and Figs. 4 and 5 are enlarged detail views of a belt employed in connection with my invention.

Referring to the drawings, an electrically heated vulcanizer 1 is held in position against a tire 2, which is mounted in the usual manner upon the rim 3 of a supporting wheel 4, by means of a plurality of straps or belts 5 and 6 of soft pliable material.

The vulcanizer 1 comprises a working body member 7 of any well known construction that is electrically heated in a manner that is familiar to those skilled in the art. Secured to the working member 7 is a handle 8 through which a flexible service cord 9 extends from an inclosed heater unit (not shown) and is adapted for connection to a suitable source of energy (not shown). A plurality of longitudinally disposed cylindrical strain or guide members 10 are rigidly and suitably attached to the respective sides of the working member 7 in pairs and are adapted to coöperate with the straps or belts 5 and 6 in pairs.

Although I have shown the strain or guide members 10 as rigidly secured to the working member 7 by means of metallic straps, angle irons and channel members, it will, of course, be understood that said strain or guide members may be secured in position in any other suitable way. Furthermore, said strain members need not necessarily be associated in pairs, as hereinbefore set forth, as a single strain member may be provided at each side of the working member 7 to coöperate with the belts 5 and 6, as will be readily understood.

The belts 5 and 6 are preferably made of soft, pliable material, such as leather or webbing, and it is, therefore, evident that injury to the wheel rim 3 is avoided, while none of the parts to be manipulated can be heated.

A plurality of buckles 14 are preferably attached to the middle portion 15 of each belt or strap by stitching, as indicated in dotted lines in Figs. 4 and 5, although, if desired, other means of attachment may be employed. The buckles 14 may be of any well known construction, although I favor a buckle of the familiar self-tightening type, and said buckles are adapted to secure the respective ends of the belts 5 and 6 whereby the vulcanizer 1 may be tightly strapped in position.

When the vulcanizer 1 is not in use, one end of each of the belts 5 and 6 is released from its buckle and its strain or guide member, although the other end thereof is secured to the device, so that all of the parts of the device are kept together and loss thereof is prevented.

In order to attach the vulcanizer to the tire 2 and wheel 4 for purposes of repair, the working member 7 may be held in the desired position by one hand, while the free end of each of the belts 5 and 6 is passed around the wheel rim 3, threaded over the proper strain or guide member 10 and through the proper buckle 14 with the other hand, after which the belts may be tightened to the required degree in order to secure the vulcanizer 1 firmly in position. It will be found that a single person can conveniently manipulate this device in a very short time. In some cases ready access to one of the buckles 14 may be prevented, in which event, the remaining buckle may be employed.

Obviously, variations in the structural details and in the arrangement and location of parts may be effected without departing from the spirit and scope of my invention.

I claim as my invention:

1. In a vulcanizer, the combination with an electrically heated working member, and a handle containing the heater leads of a plurality of strain members associated with the working member, rollers severally disposed thereon and a plurality of belts of pliable material coöperating with said rollers for strapping the working member in position.

2. In a vulcanizer, the combination with an electrically heated working member having a plurality of strain members and rollers longitudinally disposed in pairs on the respective sides thereof and spaced therefrom and a handle containing the heater leads, of a plurality of belts of pliable material severally coöperating with said rollers in pairs for strapping said working member in position.

In testimony whereof, I have hereunto subscribed my name this 3rd day of Jan. 1912.

EDWARD E. ROSE.

Witnesses:
HAROLD D. SYMONS,
B. B. HINES.